(12) United States Patent
Callard (10) Patent No.: US 9,660,775 B2
(45) Date of Patent: May 23, 2017

(54) SYSTEM AND METHOD FOR PUNCTURED PILOT TRANSMISSION IN A WIRELESS NETWORK

(75) Inventor: Aaron James Callard, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 755 days.

(21) Appl. No.: 12/815,865

(22) Filed: Jun. 15, 2010

(65) Prior Publication Data

US 2011/0307611 A1 Dec. 15, 2011

(51) Int. Cl.
*G06F 15/173* (2006.01)
*H04L 5/00* (2006.01)
*H04W 28/06* (2009.01)

(52) U.S. Cl.
CPC ........... *H04L 5/0023* (2013.01); *H04L 5/005* (2013.01); *H04W 28/06* (2013.01)

(58) Field of Classification Search
CPC ....... H04L 5/0023; H04L 5/005; H04W 28/06
USPC ........................................................ 709/226
See application file for complete search history.

(56) References Cited

U.S. PATENT DOCUMENTS

| | | | |
|---|---|---|---|
| 7,940,740 B2* | 5/2011 | Krishnamurthy et al. | ... 370/344 |
| 8,937,902 B2* | 1/2015 | Lee | H04L 5/0023 370/328 |
| 8,983,479 B2* | 3/2015 | Ko | H04B 7/024 375/219 |
| 2008/0008212 A1* | 1/2008 | Wang et al. | 370/503 |
| 2008/0181194 A1* | 7/2008 | Lindoff et al. | 370/350 |
| 2008/0182582 A1* | 7/2008 | Bachl et al. | 455/446 |
| 2008/0232494 A1* | 9/2008 | Pan | H04B 7/0426 375/260 |
| 2009/0040919 A1* | 2/2009 | Muharemovic et al. | 370/210 |
| 2011/0261781 A1* | 10/2011 | Vrzic et al. | 370/330 |

OTHER PUBLICATIONS

Zyren, J., "Overview of the 3GPP Long Term Evolution Physical Layer," 27 pages, 2007, Freescale Semiconductor, Inc.
Myung, H. G., "Technical Overview of 3GPP LTE," May 18, 2008, 53 pages.
Sihombing, A., "Performance of Repeaters in 3GPP LTE," Master of Science Thesis, 2009, 101 pages, KTH Information and Communication Technology, Stockholm, Sweden.

* cited by examiner

*Primary Examiner* — Philip Chea
*Assistant Examiner* — Robert B McAdams
(74) *Attorney, Agent, or Firm* — Slater Matsil, LLP (57) ABSTRACT

In accordance with an embodiment, a method of operating a base station configured to communicate with at least one user device includes transmitting a first group of resource elements that include a time and a frequency. At least one of the first group's resource elements includes a reference element. It is determined if the at least one user device will decode a further resource element using the reference element of the at least one of the resource elements of the first group of resource elements. Based on the determining, if the user device will decode the further resource element, a second group of resource elements is transmitted, where at least one of the resource elements of the second group of resource elements corresponding with the at least one of the resource elements of the first group does not include a reference element.

21 Claims, 9 Drawing Sheets

SYSTEM AND METHOD FOR PUNCTURED PILOT TRANSMISSION IN A WIRELESS NETWORK

TECHNICAL FIELD

The present invention relates generally to wireless communication systems, and more particularly to a system and method for punctured pilot transmission in a wireless network.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use a one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), Evolution-Data Optimized EV-DO, or Long Term Evolution (LTE).

Some wireless communication systems, such as LTE, use orthogonal frequency division multiple access (OFDMA) to for physical layer signaling. By sending data over many carriers using a relatively long symbol duration, and by using multiple-input multiple-output (MIMO) techniques that use multi-output transmitters, satisfactory performance is achievable in a multipath environment. In such systems, a portion of the data transmitted from the base station to wireless user device is devoted to pilot tones and reference signals used by the wireless user device to model the wireless channel so that the wireless used device can effectively receive and decode the transmission from the base station.

SUMMARY OF THE INVENTION

In accordance with an embodiment, a method of operating a base station configured to communicate with at least one user device includes transmitting a first group of resource elements. Each resource element includes a time and a frequency, where at least one of the resource elements of the first group of resource elements includes a reference element. The method also includes determining if at least one user device will decode a further resource element using the reference element of at least one of the resource elements of the first group of resource elements. Based on the determining, if the user device will decode the further resource element using the reference element of at least one of the resource elements of the first group of resource elements, a second group of resource elements is transmitted, where at least one of the resource elements of the second group of resource elements corresponding with the at least one of the resource elements of the first group of reference elements does not include a reference element.

In accordance with another embodiment, a base station includes a transceiver for communicating with at least one user device and a processor for assembling resource sets for transmission by the transceiver. The resource sets include resource elements having time and frequency slots. In an embodiment, the processor is configured to assemble a first resource set including at least one resource element comprising a reference symbol in at least one first location, determine if at least one user device will decode a further resource set using the reference symbol in at least one location in the first resource set, assemble a second resource set that does not include a reference symbol in at least one first location if it is determined that at least one user device will decode the further resource set using the reference symbol.

In accordance with a further embodiment, a wireless communication device includes a transceiver for receiving resource blocks from a base station and a processor for decoding the resource blocks. The processor is configured to determine channel characteristics based on at least one reference symbol received from the base station in a predetermined resource element of a first resource block, and use the determined channel characteristics to decode a further resource block that does not have a reference symbol in the predetermined resource element of the further resource block.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, punctured pilot transmission a wireless networks. Embodiments of the invention may also be applied to transmission in other types of networks.

Figure 1:
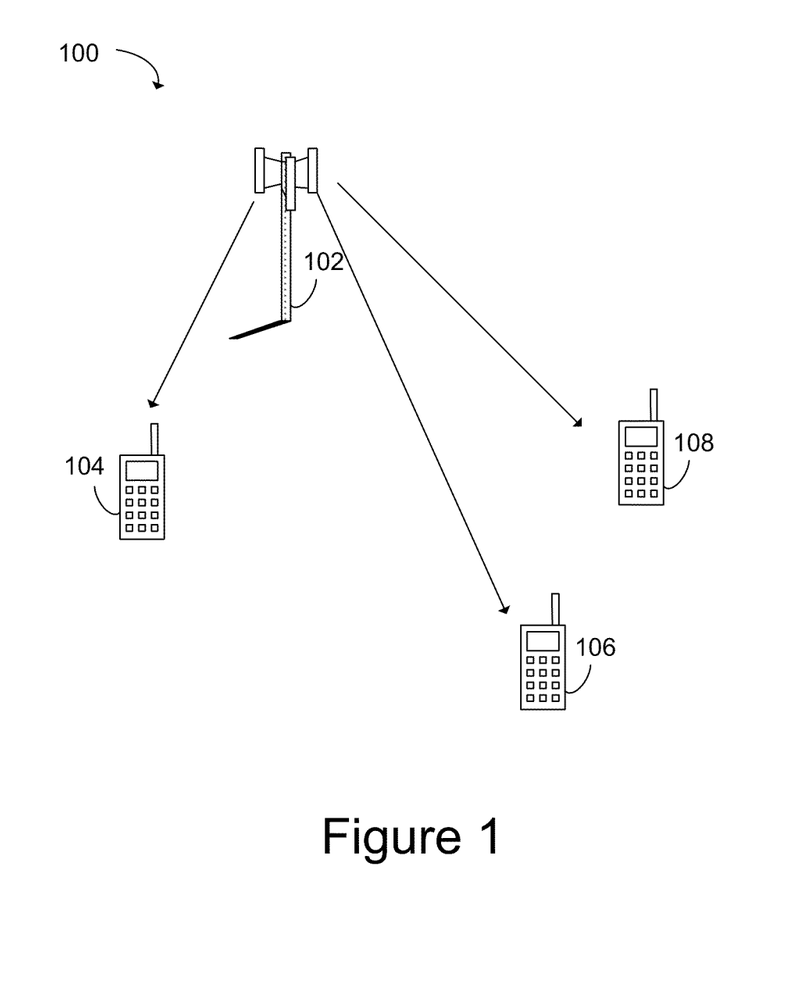
FIG. 1 illustrates a diagram of an embodiment mobile broadband system.

An illustration of an embodiment mobile broadband system 100 is illustrated in FIG. 1. Mobile broadband system 100 has base station 102 that communicates with mobile terminals or user equipment (UE) 104, 106 and 108. One base station 102 and three UEs 104, 106 and 108 are used for simplicity of illustration, however, multiple cells and UEs can be used and provided for in real systems.

Figure 2:
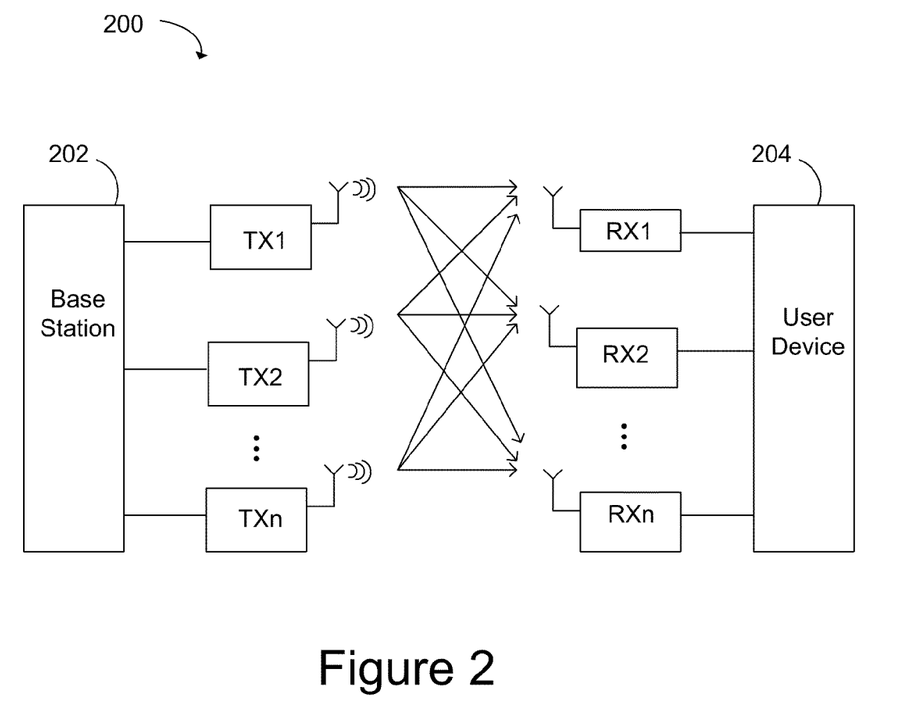
FIG. 2 illustrates an embodiment MIMO system.

In an embodiment, multiple antennas are used at both the transmitters and receivers of the system to improve system performance according to a multiple-input and multiple-output scheme (MIMO), as illustrated in system 200 of FIG. 2. System 200 has a plurality of transmitters TX1, TX2 to TXn coupled to base station 202 and a plurality of receivers RX1, RX2 to RXn coupled to user device 204. In an embodiment, any number of transmitters and any number of receivers can be present in system 200. In some embodiments, each transmitter TX1, TX2 to TXn and each receiver RX1, RX2 to RXn has a plurality of antennas (not shown). In embodiment system illustrated in FIG. 2, spatial diversity, using, for example, beam forming techniques, is used to improve system performance. In alternative embodiments of the present invention, other MIMO schemes can be used, for example, time diversity and channel diversity using multiple tones/time slots or a combination thereof.

Figure 3A:
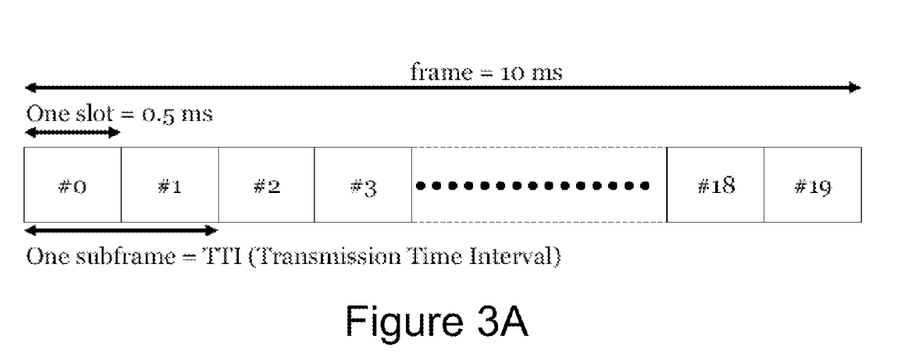
FIGS. 3a-3b illustrate embodiment frame and resource block structures.

FIG. 3a illustrates an embodiment frame according to an embodiment LTE transmission scheme. Each frame lasts 10 ms and contains 20 slots 0 to 19 that last about 0.5 ms each. Two slots make up a transmission time interval (TTI) lasting about 1 ms. In alternative embodiments, other technologies, frame structures and timing can be used.

Figure 3B:
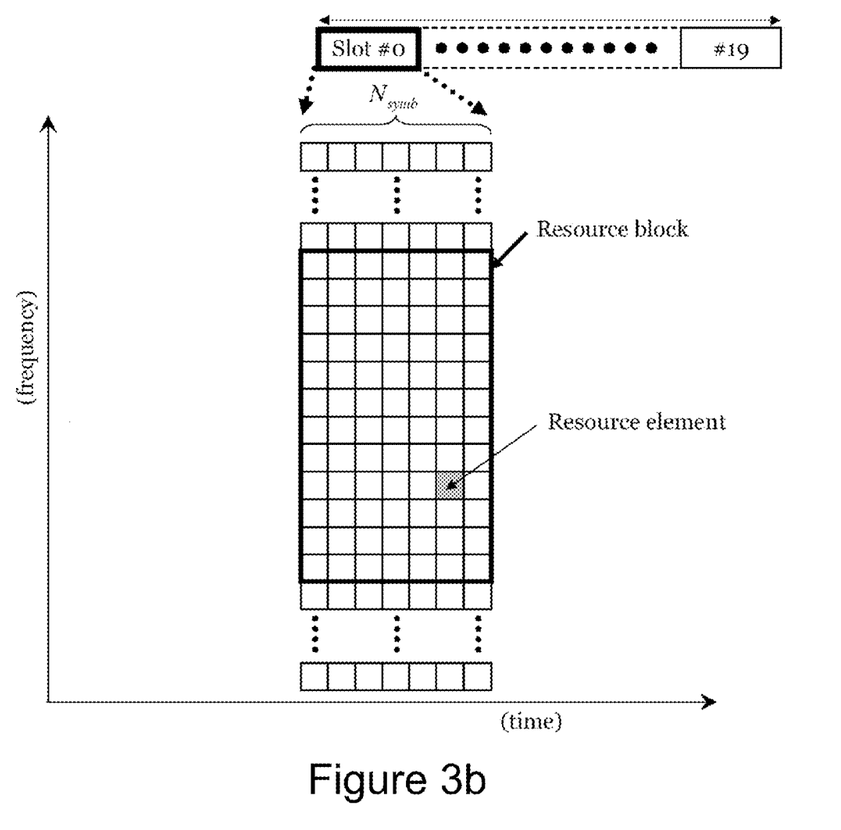

FIG. 3b illustrates an LTE resource block according to an embodiment of the present invention. Each LTE resource block is made of six or seven OFDM symbols in the time domain and 12 subcarriers in the frequency domain. Each subcarrier of an OFDM symbol is referred to as a resource element. Each slot, however, can contain multiple resource blocks. For example, in an embodiment with a 1.4 MHz channel bandwidth, there are 72 occupied subcarriers yielding 6 resource blocks. In an embodiment having a 5 MHz channel bandwidth, there are 300 occupied subcarriers yielding 25 resource blocks. Other combinations are possible according to the LTE specification. In alternative embodiments, the resource block can have an arbitrary number of symbols in the time the time domain using an arbitrary number of subcarriers in the frequency domain. In further embodiments, other modulation schemes can be used besides OFDM, for example, SC-FDMA, SC, CDMA, OQAM, and resource elements can be other types of symbols besides OFDM symbols, such as a single carrier frequency division multiple access (SC-FDMA) symbol.

Figure 4A:
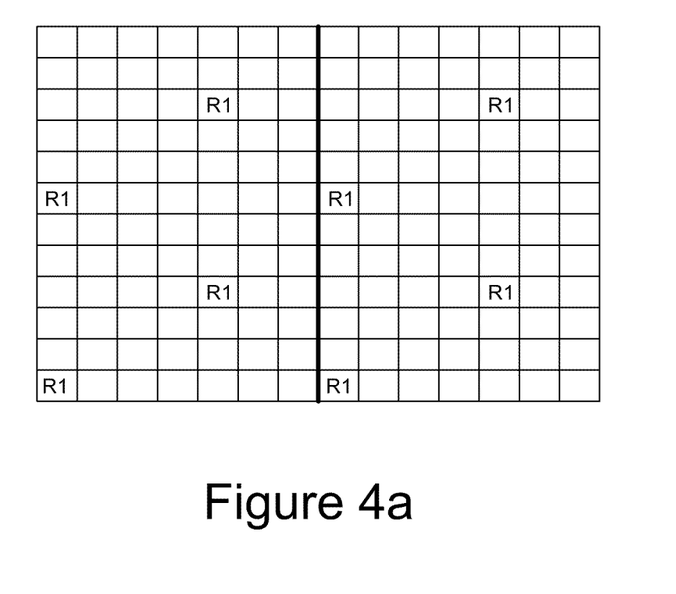
FIGS. 4a-4d illustrate example subframes with reference elements.

In embodiments that employ LTE, in order for a UE to receive and demodulate a transmission from the base station, the UE derives a channel estimation, phase shift, and timing synchronization from reference signals transmitted within some reference elements of a resource block. FIG. 4a illustrates a resource block in which resource elements R1 are used to transmit a known reference signal or pilot signal for a system with a single transmitter. Here, reference symbol R1 appears in the first and eighth time slots for the first and seventh subcarriers, and in the fifth and twelfth time slots for the fourth and tenth subcarriers. In embodiments, these reference symbols are common reference symbols (CRS), meaning that they are used by multiple UEs to derive channel information. In some embodiments, a UE will derive channel information for subcarriers that do not have a designated reference symbol by interpolation. In alternative embodiments, other resource elements besides those designated by R1 can be used for reference symbols.

Figure 4B:
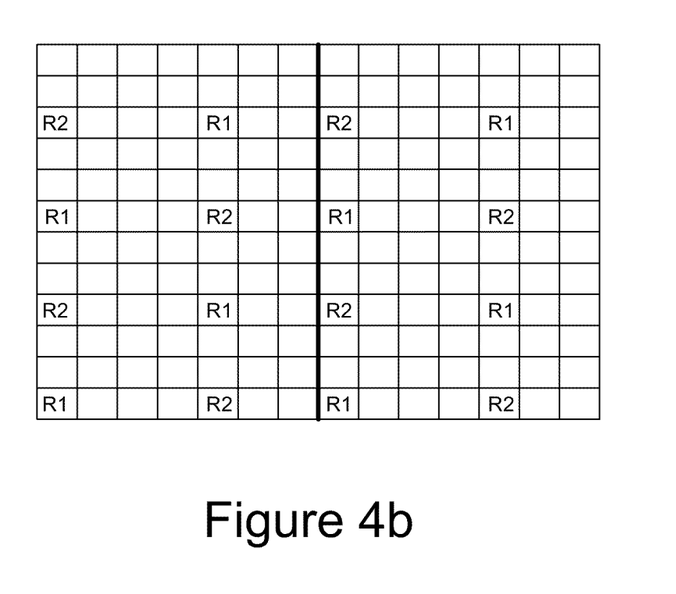
Figure 4C:
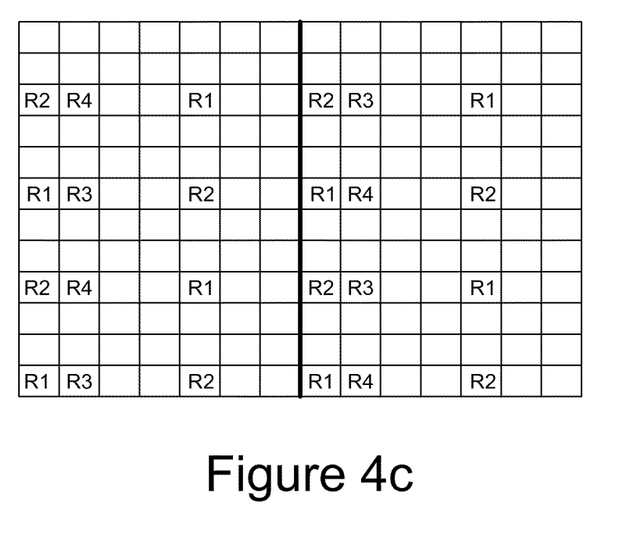
Figure 4D:
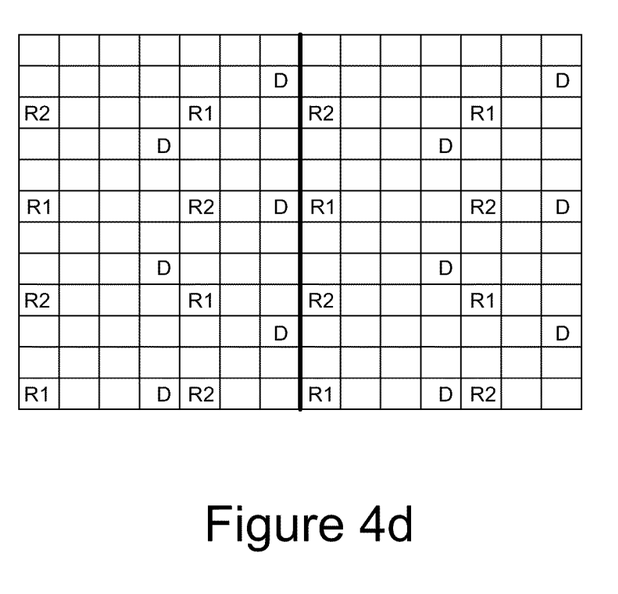

FIG. 4b illustrates a resource block in which additional CRS reference elements R2 are defined for an LTE MIMO system having two transmitters. Here, the blocks designated as R1 are transmitted over a first transmitter and the blocks designated as R2 are transmitter over a second transmitter. FIG. 4c illustrates a resource block for use with a 4 transmitter MIMO system having CRS reference elements R1 and R2 as in FIG. 4b, with the addition of CRS reference symbols R3 and R4. FIG. 4d illustrates a resource block having both CRS reference symbols R1 and R2 and dedicated reference symbols (DRS) D. Dedicated reference symbols D are transmitted on one or more transmitters of the base station, and are designated for a single UE. It can be seen that CRS and DRS reference symbols take up overhead in the system.

Figure 5A:
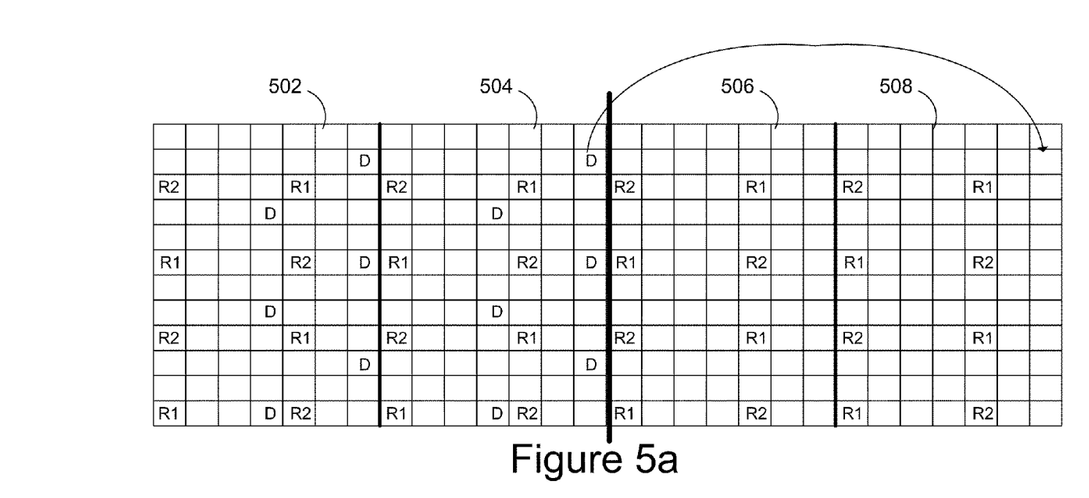
FIGS. 5a-5c illustrate embodiment subframe and resource block sequences.

In embodiments of the present invention, some reference symbols are not transmitted in every resource block. In some embodiments, UEs that are at a fixed location, or are moving at a slow velocity may not need to derive channel characteristics at every resource block to successfully decode received resource blocks. FIG. 5a illustrates four consecutive resource blocks 502, 504, 506 and 508 in which DRS reference symbols D are transmitted in first two resource blocks 502 and 504, but are not transmitted during third and fourth resource blocks 506 and 508, thereby making additional resource blocks available for additional data.

Figure 5B:
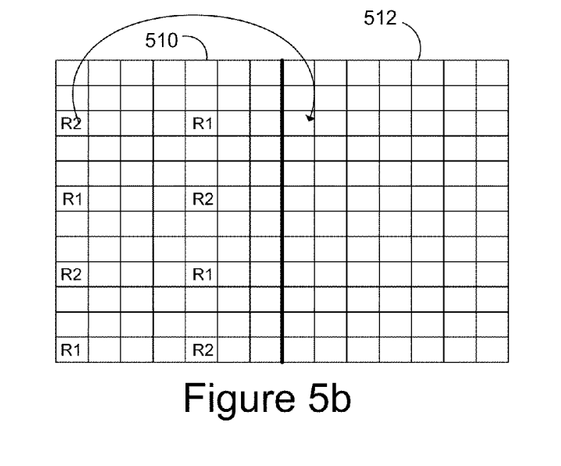

FIG. 5b illustrates two consecutive resource blocks 510 and 512 for a MIMO system having two transmitters according to an embodiment. Here, CRS reference symbols R2 and R1 are transmitted during first resource block 510, but not during second reference resource block 512. It should be noted that the resource block sequences illustrated in FIGS. 5a and 5b are two of the many examples of possible embodiment resource block sequences.

Figure 5C:
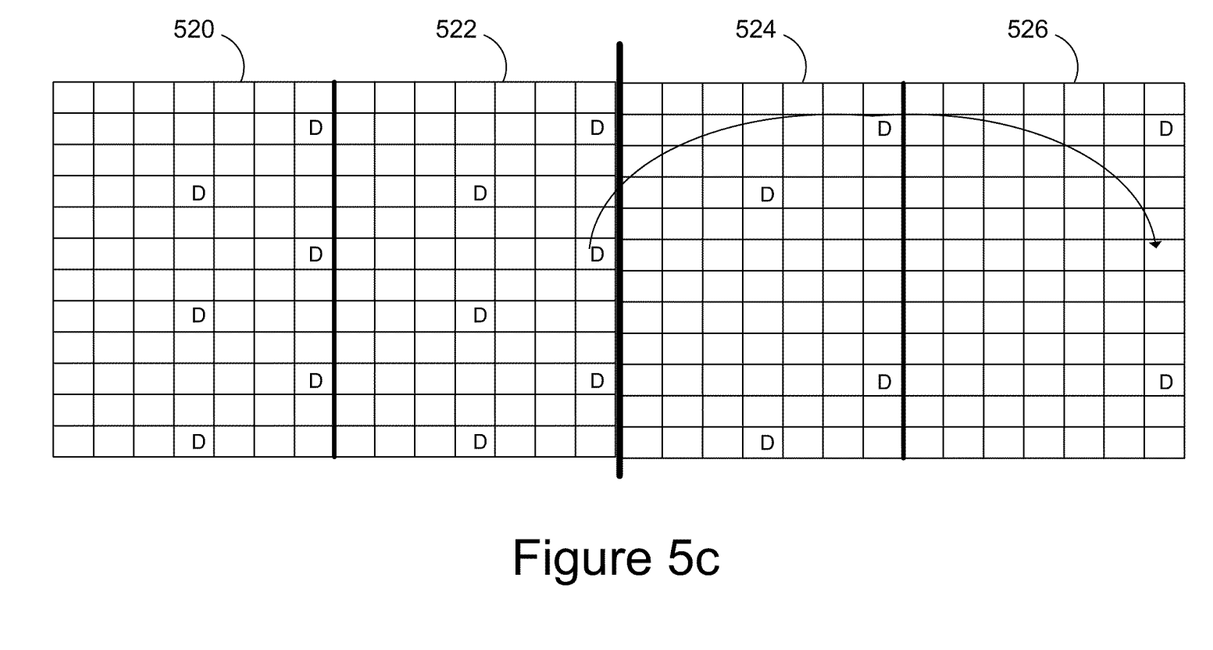

In some embodiments, a resource blocks having particular reference symbols, such as DRS symbols D in resource blocks 502 and 502 in FIG. 5a, are followed by any number of resource blocks without the particular reference symbols, such as resource blocks 506 and 508. In further embodiments, successive subframes have a reduction in reference element density. For example, FIG. 5c illustrates two consecutive subframes in which resource blocks 520 and 522 have a total of 6 DRS symbols each and resource blocks 524 and 526 have 4 DRS symbols each.

Figure 6A:
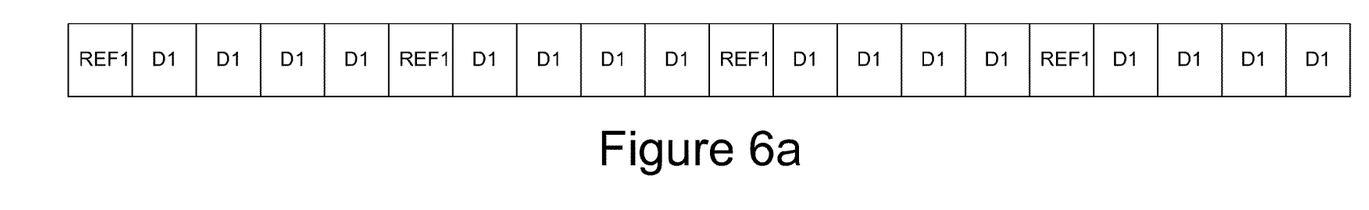
FIGS. 6a-6c illustrate embodiment subframe sequences.

In one embodiment, the number or pattern of non-reference symbol blocks that follow a reference symbol block is determined by a set schedule known by both the base station and the UE. The number of repetitions of the non-reference symbols blocks can be a function of the channel performance, or can be determined during operation depending on the channel. For example, FIG. 6a, illustrates a sequence of subframes (i.e. two consecutive reference blocks) in which subframes having a particular reference symbols are labeled "REF1" and subframes not having the particular reference symbol are labeled "D1." Here, each subframe REF1 having a particular reference symbol is followed by four subframes D1 that does not have the particular reference symbol.

Figure 6B:
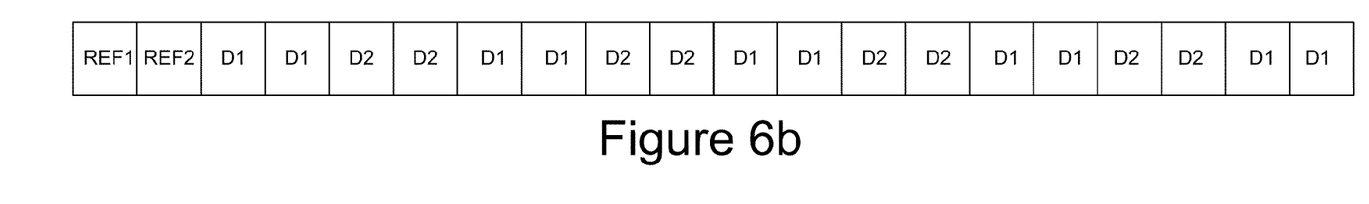

In another embodiment, a base station transmits resource blocks having different MIMO configurations, or resource blocks that are allocated to different resources. In FIG. 6b, a subframe having a first reference symbol allocation is labeled "REF1," and a subframe having a second reference symbol allocation is labeled "REF2." Subframes labeled "D1" are subframes that receive transmissions according to REF1, and subframes labeled "D2" receive transmissions according to REF2. In one example, subframes REF1 and D1 correspond to cases where a single transmitter is being used, and subframes REF2 and D2 correspond to cases where multiple transmitters are being used. Here, once REF1 and REF2 have been transmitted, a pattern of two subframes of D1 are transmitted followed by two subframes of D2. In alternative embodiments, different patterns and configurations can be used.

Figure 6C:
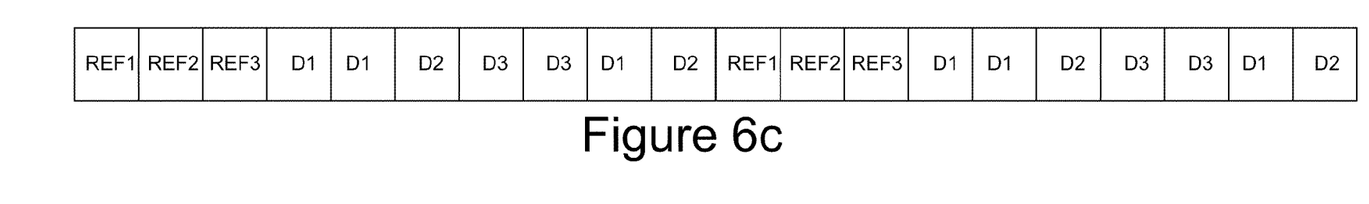

In another embodiment, three subframes with different reference symbols REF1, REF2 and REF3 are transmitted followed by subframes D1 corresponding to REF1, D2 corresponding to REF2 and D3 corresponding to REF3, that do not have the corresponding reference symbols, but operate according to the channel configuration and characteristics of respective frames REF1, REF2 and REF3, as shown in FIG. 6c. In this example, subframes D1, D2 and D3 do not have a regular repeating pattern. It should be appreciated that embodiments can have an arbitrary number of reference subframe and or resource block types followed by an arbitrary number of corresponding subframes and/or resource blocks in regular and/or irregular patterns. In some embodiments, successive subframes have a lower density of reference symbols than reference subframes. In one embodiment, the base station determines a simple repeating pattern, for example "same as last time" or "same as X times ago," with respect to a particular precoder configuration.

In one embodiment, the base station determines whether to transmit a resource block with a particular reference symbol or without a particular reference signal based on feedback from the UE. For example, the UE observes the pilot or reference signal and determines how quickly the reference signal changes, for example, by measuring a Doppler shift in frequency. If the UE notes excessive frequency shift, the UE signals the base station and requests further (or more frequent) resource blocks having reference symbols. In a further embodiment, the UE uses an accelerometer to measure changes in velocity or a GPS system to measure changes in position. The UE then provides the base station with velocity information or requests more or more frequent updates for pilot and reference signals. The base station, in turn, transmits greater or fewer subframes and/or resource blocks that have a lower density of reference symbols or subframes and/or resource blocks that have no reference symbols at all between subframes and/or resource blocks containing reference symbols.

For example, in situations with a stationary UE and a good channel, the density of reference symbols in successive subframes may be, for example, 16-0-0-0-16-0-0-0, or a subframe with 16 reference symbol followed by three subframes with no reference symbols in one embodiment. On the other hand, in situations where the UE is moving and the channel quality is not as good as in the previous case, the density of reference symbols in successive subframes may be, for example, 16-2-16-2-16-2, or a subframe with 16 reference symbol followed by a subframe with 2 reference symbols. It should be appreciated that these subframe densities are examples, and many different subframe density patterns are possible in alternative embodiments depending on the particular system, specification and environment.

In a further embodiment, the UE determines that it needs more reference signals by measuring a difference between the received pilot and/or reference symbols, and the UEs last estimate of the channel. In one embodiment, if the estimated channel is $\hat{H}$ and the received signal is HPx+n, where H is the instantaneous channel P is the precoder used, x is the data symbol, and n is the noise, the channel drift is estimated blindly from the distribution of $r=\hat{H}^H HPx+\hat{H}^H n$. If the distribution of r begins to change, for example, if $|r|^2$ begins to grow while the statistics of n stay stable, the magnitude of the change in the channel can be estimated. Alternatively, the channel is estimated after the successful decoding of data by using the decoded data symbols as pilots, for example, $He=\hat{H}x-HPx-\hat{H}^H n$. In a further embodiment, the value of $\hat{H}$ is updated based these decoded data symbols to prevent the additional transmission of precoded pilots.

In an embodiment, if the UE detects that the difference between the last estimate and the current estimate is above a threshold, the UE requests additional reference symbols or a higher reference symbol density from the base station. In one embodiment, this threshold reflects an amount of performance loss. For example, if the post processing SNR is lowered by more than a particular amount, such as 0.5 dB, due to the channel knowledge mismatch, additional reference symbols are requested. In a further embodiment, the threshold is based on a mean square error (MSE) measurement such as $\Sigma |He|^2 > E\{|n|^2\}$. In further embodiments, other threshold besides 0.5 dB can be used.

In an embodiment, the UE signals the base station via acknowledge and not-acknowledge (ACK-NACK). When the UE is able to decode a transmission from the base station, the UE transmits an acknowledge (ACK) message to the base station. If, on the other hand, the UE is unable to fully decode the transmission from the base station, the UE sends back a non-acknowledge (NACK) message to the base station. In one embodiment, the base station uses the number of received ACK and NACKS to determine the density of reference symbols in succeeding resource blocks. In one embodiment, a ratio of ACKS to NACKs, or ratio of NACKS to ACKS is used.

In an embodiment, a precoding matrix indicator (PMI) indication mode is created which instructs a UE to use channel information from last transmission. When a UE or relay node (RN) receives the mode indication it estimates the channel using pilots received during last data transmission. In one embodiment, the channel is estimated using DRS/CRS in a particular TTI. The UE updates the channels phase using a phase offset to compensate for LO drift as well as other variations, and then uses that channel for data demodulation.

Figure 7:
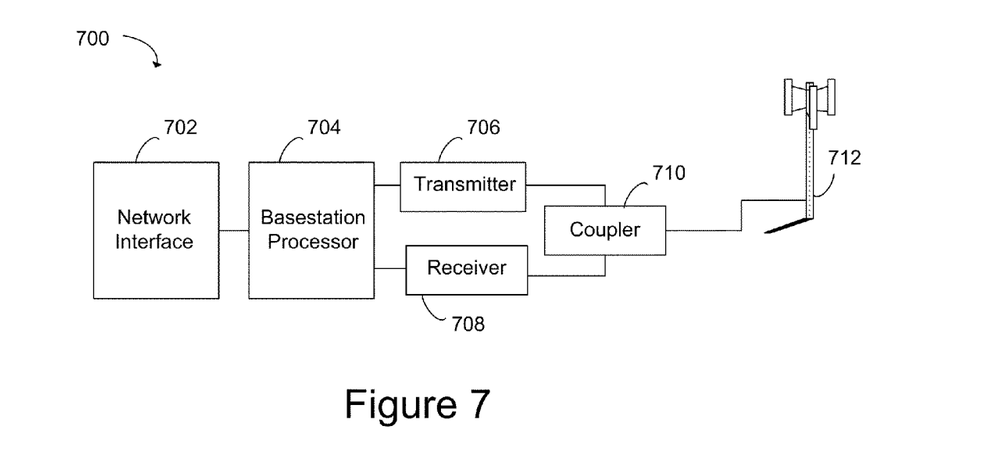
FIG. 7 illustrates a block diagram of an embodiment base station.

A block diagram of an embodiment base station 700 is illustrated in FIG. 7. Base station 700 has a base station processor 704 coupled to transmitter 706 and receiver 708, and network interface 702. Transmitter 706 and receiver 708 are coupled to antenna 712 via coupler 710. Base station processor 704 executes embodiment methods and algorithms. In an embodiment of the present invention, base station 700 is configured to operate in a LTE network using an OFDMA downlink channel divided into multiple subbands and using single carrier FDMA in the uplink. In alternative embodiments, other systems, network types and transmission schemes can be used, for example, 1×EV-DO, IEEE 802.11, IEEE 802.15 and IEEE 802.16. In alternative embodiments, base station 700 can have multiple transmitters, receivers and antennas (not shown) to support MIMO operation.

Figure 8:
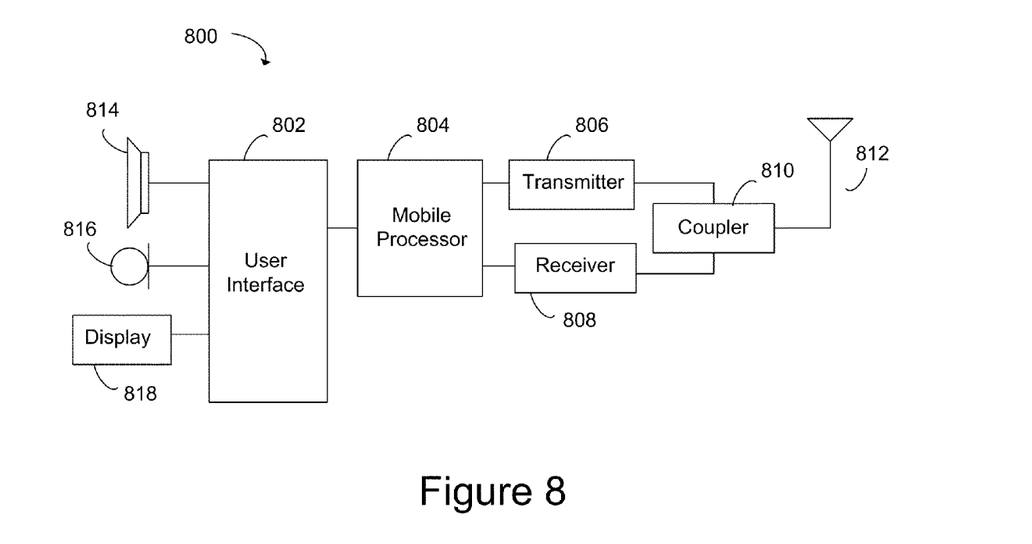
FIG. 8 illustrates a block diagram of an embodiment user device.

A block diagram of an embodiment user device 800 is illustrated in FIG. 8. User device 800 can be, for example, a cellular telephone or other mobile communication device, such as a computer or network enabled peripheral. Alternatively, user device 800 can be a non-mobile device, such as a desktop computer with wireless network connectivity. User device 800 has mobile processor 804, transmitter 806 and receiver 808, which are coupled to antenna 812 via coupler 810. User interface 802 is coupled to mobile processor 804 and provides interfaces to loudspeaker 814, microphone 816 and display 818, for example. Alternatively, user device 800 may have a different configuration with respect to user interface 802, or user interface 802 may be omitted entirely. In embodiment, user device is configured to operate according to embodiment algorithms. In alternative embodiments, user device 800 can have multiple transmitters, receivers and antennas (not shown) to support MIMO operation.

In accordance with an embodiment, a method of operating a base station configured to communicate with at least one user device includes transmitting a first group of resource elements. Each resource element includes a time and a frequency, where at least one of the resource elements of the first group of resource elements includes a reference element. The method also includes determining if the at least one user device will decode a further resource element using the reference element of the at least one of the resource elements of the first group of resource elements. Based on the determining, if the user device will decode the further resource element using the reference element of the at least one of the resource elements of the first group of resource elements, a second group of resource elements is transmitted, where at least one of the resource elements of the second group of resource elements corresponding with the at least one of the resource elements of the first group of reference elements does not include a reference element.

In an embodiment, the method further includes transmitting a further group of resource elements, where at least one of the resource elements of the further block corresponding with the at least one of the resource elements of the first group of resource elements does not comprise a reference element. In an embodiment, determining comprises receiving transmissions from user devices to determine whether a further reference element is necessary. In one embodiment, the further reference element is deemed necessary if a ratio of non-acknowledge messages to acknowledge messages from a user device is greater than a threshold.

In a further embodiment, receiving transmissions from the user devices includes receiving status messages from the user devices. In some embodiments, the reference element includes a common reference symbol and/or a dedicated reference symbol.

In an embodiment, the base station transmits a further first group of reference elements after transmitting a predetermined number of second groups of reference elements. In a further embodiment, the base station operates in a long term evolution (LTE) system and the first and second groups of resource elements include a resource block. In an embodiment, the second group of resource elements has a lower density of reference symbols than the first group of reference elements.

In accordance with another embodiment, a base station includes a transceiver for communicating with at least one user device and a processor for assembling resource sets for transmission by the transceiver. The resource sets include resource elements having time and frequency slots. In an embodiment, the processor is configured to assemble a first resource set including at least one resource element comprising a reference symbol in at least one first location, determine if the at least one user device will decode a further resource set using the reference symbol in the at least one location in the first resource set, and assemble a second resource set that does not include a reference symbol in the at least one first location if it is determined that the at least one user device will decode the further resource set using the reference symbol.

In an embodiment, the reference symbol includes a dedicated reference symbol for a single user device. In a further embodiment, the base station transmits a fixed number of second resource blocks between transmitting a first resource set.

In an embodiment, a density of reference symbols sent to user devices traveling at higher velocities is higher then a density of reference symbols transmitted to user devices traveling at lower velocities. In an embodiment, reference symbol densities are determined by a ratio of first resource sets transmitted to second resource sets transmitted in a time period. In an embodiment, the base station is configured to operate in a long term evolution (LTE) system. In a further embodiment, the first and second resource sets are resource blocks.

In accordance with a further embodiment, a wireless communication device includes a transceiver for receiving resource blocks from a base station and a processor for decoding the resource blocks. The processor is configured to determine channel characteristics based on at least one reference symbol received from the base station in a predetermined resource element of a first resource block, and use the determined channel characteristics to decode a further resource block that does not have a reference symbol in the predetermined resource element of the further resource block. In an embodiment, the processor is further configured to determine whether the determined channel characteristics adequately decodes the further resource block, and the wireless communication device transmits a request for at least one further reference signal from the base station if the wireless communication device does not determine the that determined channel characteristics are adequate to decode the further resource block. In an embodiment, the request comprises a no-acknowledgement transmission.

In an embodiment, the processor determines whether the determined channel characteristics adequately decode the further resource block by measuring a difference between a received reference signal and a last estimate of the received reference signal. In a further embodiment, the processor determines whether the determined channel characteristics adequately decode the further resource block if the difference between a received reference signal and a last estimate of the received reference signal is less than a predetermined threshold.

In an embodiment, the transceiver receives first and second resource blocks according to a predetermined schedule. In a further embodiment, the reference symbol comprises a dedicated reference signal of a Long Term Evolution (LTE) signal.

Advantages of embodiments include a reduced overhead with respect to reference symbols. By reducing overhead, higher data rates can be achieved. Due to the high overhead of DRS some advanced methods using DRS are overly beneficial (MU-MIMO, CoMP etc). In some embodiments, embodiment algorithms are used conjunction with these existing features to allow for greater overall gains. For example, in one embodiment, Multi-Media Broadcast over a Single Frequency Network (MBSFN) subframes are used with embodiment algorithms to reduce CRS overhead or overhead taken by other types of pilot transmissions.

Although present embodiments and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a base station configured to communicate with at least one user device, the method comprising:
    transmitting, by the base station in a first slot of a subframe, a first group of resource elements, each resource element comprising a time and a frequency, wherein at least one of the resource elements of the first group of resource elements comprises a reference element;
    determining, by the base station, if the at least one user device will decode a further resource element using the reference element of the at least one of the resource elements of the first group of resource elements, wherein the reference element comprises a dedicated reference symbol (DRS) for use in channel estimation and demodulation; and
    in accordance with determining the user device will decode the further resource element using the reference element of the at least one of the resource elements of the first group of resource elements, transmitting, by the base station in a second slot of the subframe, a second group of resource elements, wherein at least one of the resource elements of the second group of resource elements corresponding with the at least one of the resource elements of the first group of resource elements does not comprise the reference element, and wherein the second group of resource elements has a lower DRS density than the first group of resource elements.

2. The method of claim 1, further comprising transmitting a further group of resource elements, wherein the at least one of the resource elements of the further group of resource elements corresponding with the at least one of the resource elements of the first group of resource elements does not comprise a reference element.

3. The method of claim 1, wherein determining comprises receiving transmissions from user devices to determine whether a further reference element is necessary.

4. The method of claim 3, wherein the further reference element is deemed necessary in accordance with a ratio of non-acknowledge messages to acknowledge messages from a user device being greater than a threshold.

5. The method of claim 3, wherein receiving transmissions from the user devices comprises receiving status messages from the user devices.

6. The method of claim 1, wherein the base station transmits a further first group of resource elements after transmitting a predetermined number of second groups of resource elements.

7. The method of claim 1, wherein the base station operates in a long term evolution (LTE) system and the first and second groups of resource elements are resource blocks.

8. The method of claim 1, wherein the second group of resource elements has a lower density of reference symbols than the first group of resource elements.

9. A base station comprising:
    a processor, of the base station, for assembling resource sets for transmission by a transceiver, the resource sets comprising resource elements, each resource element having a time and a frequency, wherein the processor is configured to:
        assemble a first resource set comprising at least one resource element comprising a reference symbol in at least one first location,
        determine if at least one user device will decode a further resource set using the reference symbol in the at least one first location in the first resource set, wherein the reference symbol comprises a dedicated reference symbol (DRS) for use in channel estimation and demodulation, and
        assemble a second resource set that does not comprise a reference symbol in the at least one first location in accordance with determining the at least one user device will decode the further resource set using the reference symbol, wherein the second resource set has a lower DRS density than the first resource set; and
    the transceiver, of the base station, for communicating with the at least one user device, and configured to transmit the first resource set in a first slot of a subframe, and to transmit the second resource set in a second slot of the subframe.

10. The base station of claim 9, wherein the reference symbol is the dedicated reference symbol for a single user device.

11. The base station of claim 10, wherein the base station is configured to transmit a fixed number of second resource sets between transmitting first resource sets.

12. The base station of claim 11, wherein a density of reference symbols sent to user devices traveling at higher velocities is higher than a density of reference symbols transmitted to user devices traveling at lower velocities, and wherein reference symbol densities are determined by a ratio of first resource sets transmitted to second resource sets transmitted in a time period.

13. The base station of claim 9, wherein the base station is configured to operate in a long term evolution (LTE) system.

14. The base station of claim 9, wherein the first and second resource sets are resource blocks.

15. A wireless communication device comprising:

a transceiver, of the wireless communications device, for receiving resource blocks from a base station, and configured to receive a first resource block in a first slot of a subframe, and to receive a further resource block in a second slot of the subframe; and a processor, of the wireless communications device, for decoding the resource blocks, wherein the processor is configured to:

determine channel characteristics in accordance with at least one reference symbol received from the base station in a predetermined resource element of the first resource block, wherein the reference symbol comprises a dedicated reference symbol (DRS) for use in channel estimation and demodulation, and use the determined channel characteristics to decode the further resource block that does not have the reference symbol in the predetermined resource element of the further resource block, wherein the further resource block has a lower DRS density than the first resource block.

16. The wireless communication device of claim 15, wherein:

the processor is further configured to determine whether the determined channel characteristics adequately decode the further resource block; and the wireless communication device is configured to transmit a request for at least one further reference symbol from the base station in accordance with the wireless communication device determining the determined channel characteristics are not adequate to decode the further resource block.

17. The wireless communication device of claim 16, wherein the request comprises a no-acknowledgement transmission.

18. The wireless communication device of claim 16, wherein the processor is configured to determine whether the determined channel characteristics adequately decode the further resource block by measuring a difference between a received reference symbol and a last estimate of the received reference symbol.

19. The wireless communication device of claim 18, wherein the processor is configured to determine whether the determined channel characteristics adequately decodes the further resource block in accordance with the difference between a received reference symbol and a last estimate of the received reference symbol being less than a predetermined threshold.

20. The wireless communication device of claim 15, wherein the transceiver is configured to receive first and second resource blocks according to a predetermined schedule.

21. The wireless communication device of claim 15, wherein the reference symbol is the dedicated reference symbol and is a Long Term Evolution (LTE) symbol.

* * * * *